United States Patent [19]

Lin et al.

[11] Patent Number: 6,075,070

[45] Date of Patent: Jun. 13, 2000

[54] MARKING INSTRUMENT INCLUDING LIQUID INK

[75] Inventors: Nan-Jae Lin, Burlington; Andrew R. Klassman, Sharon, both of Mass.; Roy Nicoll, Wokingham; Charles Christopher Packham, Crowthorne, both of United Kingdom; Vliet Hulse, Duxbury; John Thompson, Medfield, both of Mass.

[73] Assignee: The Gillette Company, Boston, Mass.

[21] Appl. No.: 08/706,901

[22] Filed: Sep. 3, 1996

Related U.S. Application Data

[60] Continuation of application No. 08/460,922, Jun. 5, 1995, abandoned, which is a division of application No. 08/139,225, Oct. 18, 1993, abandoned.

[51] Int. Cl.⁷ .................................................. C09D 11/18
[52] U.S. Cl. .............................. 523/161; 260/DIG. 38; 401/141; 401/142; 401/198; 401/209; 524/509; 524/516; 524/542; 106/31.13; 106/31.27; 106/31.28
[58] Field of Search .................. 523/161; 260/DIG. 38; 401/141, 142, 198, 209; 524/509, 516, 542; 106/31.13, 31.27, 31.28, 20 R, 22 R

[56] References Cited

U.S. PATENT DOCUMENTS

| | | | |
|---|---|---|---|
| 2,870,742 | 1/1959 | Hackmyer | 401/135 |
| 2,874,679 | 2/1959 | Zepelovitch | 401/148 |
| 3,420,610 | 1/1969 | Malm | 401/112 |
| 3,424,537 | 1/1969 | Henriksen | 401/142 |
| 3,656,857 | 4/1972 | Seregely | 401/142 |
| 3,792,932 | 2/1974 | Henriksen | 401/148 |
| 3,834,823 | 9/1974 | Seregely et al. | 401/198 |
| 3,875,105 | 4/1975 | Daugherty et al. | 260/33.2 R |
| 3,884,707 | 5/1975 | Dick et al. | 106/24 |
| 3,949,132 | 4/1976 | Seregely et al. | 428/207 |
| 4,389,499 | 6/1983 | Riesgraf | 523/161 |
| 4,390,646 | 6/1983 | Ferguson | 523/161 |
| 4,391,927 | 7/1983 | Farmer | 523/161 |
| 4,471,079 | 9/1984 | Enami | 523/161 |
| 4,509,876 | 4/1985 | Hori | 401/217 |
| 4,721,739 | 1/1988 | Brenneman et al. | 523/161 |
| 4,786,198 | 11/1988 | Zgambo | 401/142 |
| 4,940,628 | 7/1990 | Lin et al. | 428/207 |
| 4,973,180 | 11/1990 | Hori | 401/141 |
| 5,120,359 | 6/1992 | Uzukawa et al. | 106/20 |

FOREIGN PATENT DOCUMENTS

| | | |
|---|---|---|
| 0 109 726 | 5/1984 | European Pat. Off. ........ C09D 11/16 |
| 0 413 273 A1 | 2/1991 | European Pat. Off. .......... B43K 5/18 |
| 0 476 492 A1 | 3/1992 | European Pat. Off. .......... B43K 5/18 |
| 153504 | 10/1987 | France . |
| 926 054 | 12/1954 | Germany . |
| 60-158277 | of 0000 | Japan . |
| 135878 | 8/1982 | Japan .............................. C09D 11/18 |
| 59-068381 | 4/1984 | Japan . |
| 60-158277 | 8/1985 | Japan . |
| 61-60768 | 12/1988 | Japan . |
| 2-20982 | 2/1990 | Japan . |
| 3-13396 | 1/1991 | Japan .............................. B43K 7/02 |
| 91-013396 | 1/1991 | Japan .............................. B43K 7/02 |
| 3-73398 | 3/1991 | Japan .............................. B43K 8/02 |
| 4-85094 | 3/1992 | Japan .............................. B43K 8/02 |
| 4-119897 | 4/1992 | Japan .............................. B43K 8/02 |
| 92-332697 | 11/1992 | Japan .............................. B43K 8/02 |
| 92-332698 | 11/1992 | Japan .............................. B43K 8/02 |
| 93-007822 | 1/1993 | Japan .............................. B43K 7/02 |
| WO 93/05966 | 4/1993 | WIPO . |

OTHER PUBLICATIONS

British Provisional Specification No, 812,704, Marks & Clerk, Apr. 15, 1957.

*Primary Examiner*—Terrel Morris
*Assistant Examiner*—John J. Guarriello
*Attorney, Agent, or Firm*—Fish & Richardson P.C.

[57] ABSTRACT

A marking instrument includes a non-erasable ink including a colorant and a solvent having a water content of about 0–15% by weight and a viscosity of about 15 to 4,500 cps.

13 Claims, 3 Drawing Sheets

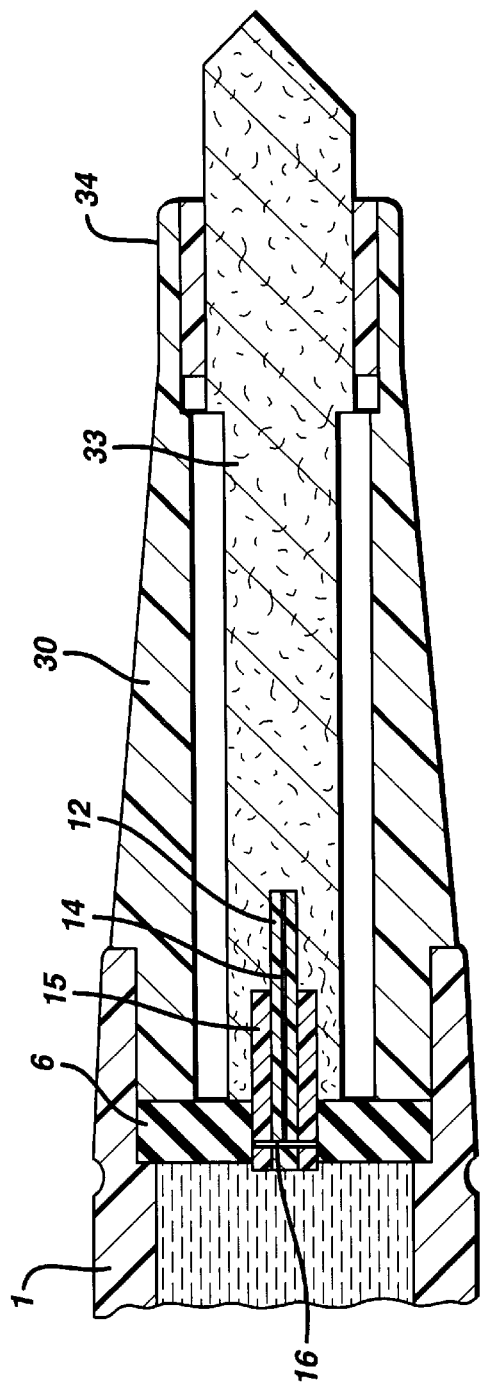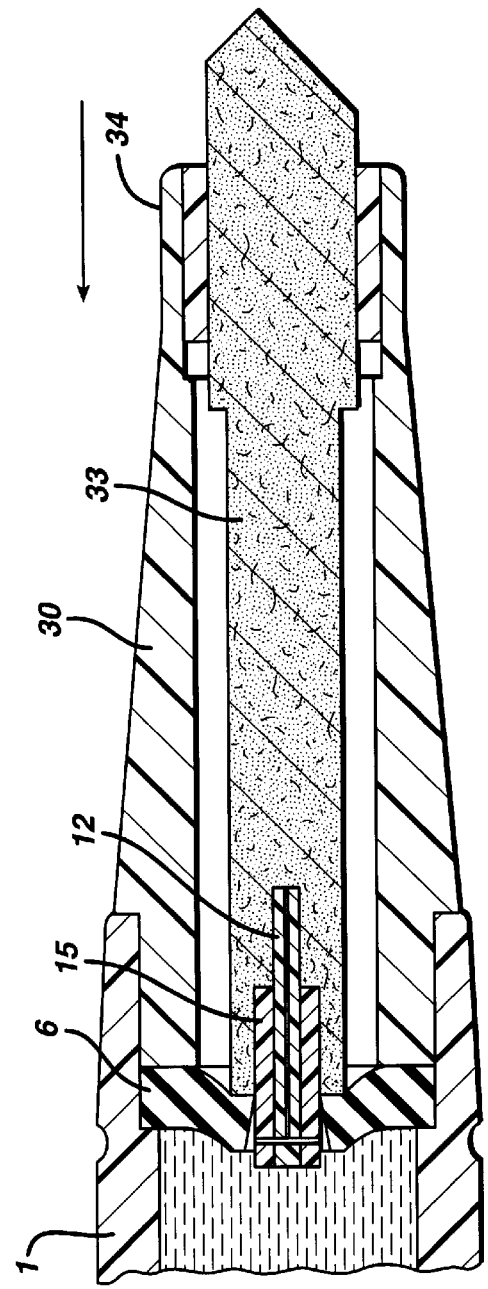

6,075,070

MARKING INSTRUMENT INCLUDING LIQUID INK

This is a continuation of application Ser. No. 08/460,922, now abandoned filed Jun. 5, 1995, now abandoned, which is a divisional of Ser. No. 08/139,255 now abd. filed Oct. 18, 1993.

BACKGROUND OF THE INVENTION

The present invention relates to liquid inks. More particularly, it relates to liquid inks for marking instruments.

Marking instruments, e.g., pens and markers, have a tip to which a liquid ink is supplied from a reservoir to be applied onto a substrate, such as a sheet of paper, by means of the tip which is moved over the surface of the substrate to leave a liquid trace.

Traditionally, liquid inks for marking instruments either have a viscosity of about 5 centipoise ("cps") or lower (e.g., for fiber tip pens or fountain pens), or have a viscosity of about 7,500 cps or higher (e.g., for ball point pens). The latter usually contain a certain amount of a polymeric material(s).

SUMMARY OF THE INVENTION

One of the features of the present invention involves non-erasable liquid inks for marking instruments with a distinctive range of viscosity.

Thus, one aspect of the invention relates to a non-erasable liquid ink, with a water content of about 0–15% by weight, for a marking instrument. By "erasable ink" is meant an ink, which, after being deposited on a porous substrate, cannot be erased using a conventional rubbery eraser. The non-erasable ink includes a solvent and a colorant, e.g., a dye or a pigment, dissolved or dispersed in the solvent, and has a viscosity of about 15 to 4,500 cps. More preferred ranges of viscosity include, but are not limited to, about 50 to 2,000 cps, about 100 to 1,000 cps, or about 150 to 600 cps. The viscosity of an ink of this invention described herein is that measured at a shear rate of 300 sec$^{-1}$ at room temperature.

The liquid ink may also contain one or more polymers with averaged molecular weights (measured by the number average molecular weight method) ranging from about $1\times10^4$ to $1\times10^6$ daltons (preferably, about $1\times10^5$ to $6\times10^5$ daltons) with the total content of the polymer(s) being about 0.05% to 2.5% by weight of the ink. A more preferred range of the total polymer contents is about 0.05% to 1.0%. It is particularly preferred that the total polymer content be about 0.3%. Examples of suitable polymers include, but are not limited to, polyvinylpyrolidone ("PVP") and ketone/formaldehyde resin.

Preferably, one or more lubricants, such as oleic acid or oleic diethanolamine ("ODEA"), can be incorporated in the liquid ink as to decrease friction resulting either from contact between a marking instrument and the substrate (e.g., paper) onto which a marking is being made, or, in the case of a ballpoint pen, from contact between the roller ball and the socket, thereby enhancing smoothness in using the marking instrument.

The colorant used in the liquid ink may be either a dye (i.e., which can be dissolved in a solvent), or a pigment (i.e., which can only be dispersed, rather than dissolved, in a solvent). When a pigment is used, it is preferred that a gelling agent be also included in the ink so as to prevent pigment sedimentation or ink leakage.

Another aspect of this invention relates to a non-erasable liquid ink, with a water content of about 0–15% by weight, for a marking instrument which includes (i) one or more polymers with averaged molecular weights ranging from about $1\times10^4$ to $1\times10^6$ daltons, preferably, about $1\times10^5$ to $6\times10^5$ (e.g., PVP or ketone/formaldehyde resin), (ii) a colorant, and (iii) a solvent, with the total content of the polymer(s) being about 0.05% to 2.5% by weight (more preferably, about 0.05% to 1% by weight) of the ink. In a particularly preferred embodiment, the total polymer content is about 0.3% by weight. Similarly, whenever necessary, other ingredients, such as a lubricant or a gelling agent, can also be included in the ink.

Note that a colorant incorporated in an ink of this invention does not include a colored polymer, e.g., polymeric dyestuff. Similarly, a polymer used in this invention is, by definition, not colored. By "polymer" is meant a macromolecule consisting essentially of repeating units with a molecular weight of at least $1\times10^4$ daltons. A preferred M.W. range is about $1\times10^4$ to $1\times10^6$ daltons. A particularly preferred M.W. range is about $1\times10^5$ to $6\times10^5$ daltons.

Also within the scope of this invention is a marking instrument which includes: a body, a reservoir chamber within the body, and a liquid ink in the chamber. The liquid ink may be an ink of the present invention as described above, or an ink of a lower viscosity which is most suitable for use in fiber tip pens or fiber tip highlighters.

Preferably, the marking instrument further includes an ink feed device having a channel for conducting the ink from the chamber to a marking tip, an elastomeric member which partly confines the chamber and supports the feed device with respect to the body, and a valve defined by the feed device and the elastomeric member for controlling communication between the chamber and the channel, whereby the feed device is retractable relative to the body under a force exerted against the tip, and in response to such retraction the chamber is pressurized by deflection of the elastomeric member and the valve is opened to allow the ink to enter the channel from the chamber. Note that the marking instrument constructed in a manner described above may be equipped with a variety of different marking tips (e.g., a roller ball) and is not limited to any particular type of tip.

A further aspect of the present invention relates to a method of making a marking on a substrate, e.g., a piece of paper. The method includes the steps of: providing one of the above-described liquid inks of this invention, and applying the liquid ink against a surface of the substrate forming a marking.

One feature of the invention is the use of the valved ink feed device which allows lower viscosity ink to flow to the marking tip only when the tip is pressed against a writing surface. Without this valve restricting flow to the tip, the lower viscosity ink would tend to leak from the marking tip. By use of this valved ink feed device, lower viscosity ink can now be used, the ink having lower writing friction when applied.

Other features and advantages of the present invention will be apparent from the following drawings and description of the preferred embodiments, and also from the appending claims.

BRIEF DESCRIPTION OF THE DRAWINGS

The drawings are first briefly described.

FIG. 3 is a longitudinal cross-section through a forward end part of a fiber tip highlighting marker in accordance with another embodiment of the invention, the valve being shown closed;

FIG. 4 is the fiber tip marker of FIG. 3 with the valve opened; and

DESCRIPTION OF THE PREFERRED EMBODIMENTS

Figure 1:
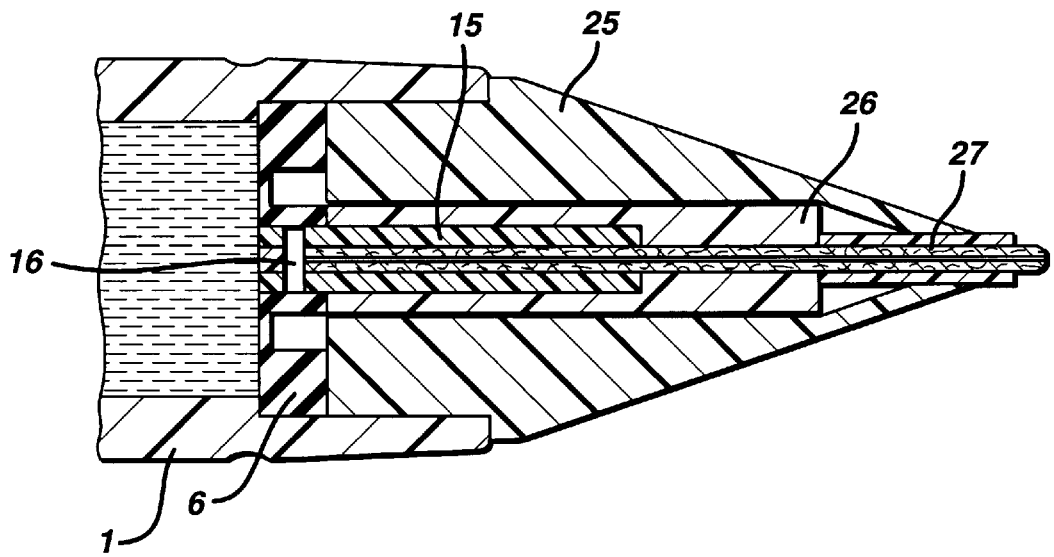
FIG. 1 is an axial cross-section through a forward end portion of a fiber tip pen according to an embodiment of the invention, the valve being shown in a closed condition.

Colorants to be used to prepare a liquid ink of this invention can either be dyes or pigments. Examples of dyes include, but are not limited to, Solvent Blue 38, Solvent Violet 8, Basic Blue 7, Solvent Red 125, and Solvent Black 46. On the other hand, Pigment Blue 6, Phathalo Blue, Pigment Blue 15.2 and Carbon Black are examples of pigments. More than one dye or pigment can be used in a liquid ink to obtain the desired color, shade and the like. The viscosity of a liquid ink can also be "fine-tuned" by varying its dye content.

Selection of solvents depends on, among others, the dyes or pigments to be used. Solvents suitable for preparation of liquid inks include, but are not limited to, diethylene glycol monoethyl ether, phenyl cellosolve, ethylene glycol phenyl ether, dipropylene glycol and octylene glycol. As an example, diethylene glycol monoethyl ether can be used to dissolve Solvent Blue 38. Pigments, on the other hand, can be dispersed in solvents by techniques well known in the art, such as using high shear mixing equipment. Of note, solvents with low volatility (e.g., boiling point higher than 180° C.) and high hygroscopicity are preferred. Also note that more than one solvent can be included in a liquid ink either to improve the solubility of a dye or the dispersion of a pigment, or to "fine-tune" the viscosity of the ink.

However, a more drastic adjustment of viscosity is achieved by incorporating in a liquid ink one or more polymers having averaged molecular weights ranging from about $1 \times 10^4$ to $1 \times 10^6$ daltons. Examples of such polymers include, but are not limited to, PVP and ketone/formaldehyde resin. Note that PVP does not only confer viscosity on a liquid ink, it also serves as an elasticizer. By "elasticizer" is meant an ingredient in a liquid ink which makes the ink less likely to build up undesirably at the marking tip of a marking instrument during use. Whenever necessary, a proper elasticizer, regardless of its molecular weight, can also be incorporated in a liquid ink to reduce or eliminate buildup.

Also can be included in a liquid ink of this invention is a lubricant, such as oleic acid or oleic diethanolamine, to reduce the friction which is generated from contact between a marking instrument and the substrate on which a marking is being made or between the ball and the socket of a ballpoint pen, as well as to prevent hard starting.

When a pigment is used to prepare a liquid ink, a gelling agent may also be included in the ink so as to prevent pigment sedimentation or ink leakage. A gelling agent is added to a liquid ink to provide the ink with an yield point and to make the ink shear thinning, thus retard the sedimentation of pigment.

The liquid ink of this invention is most suitable for use in a marking instrument having a feed device which conducts marking liquid from the reservoir chamber to the marking tip supported by an elastomeric diaphragm which partly confines the reservoir chamber and forms a valve with the feed device so that, when the tip is applied against a surface, the feed device retracts causing the diaphragm to pressurize the liquid in the reservoir and open the valve whereby liquid is pumped to the tip.

For examples of such a "diaphragm valve" assembly, please refer to PCT Application WO 93/05966 (publication date: Apr. 1, 1993), which is incorporated by reference in its entirety and attached as Appendix A. FIGS. 5, 6, 7, 8 and 14 of the referenced PCT application have been included in the drawings herein as FIGS. 1, 2, 3, 4 and 5, respectively.

Figure 2:
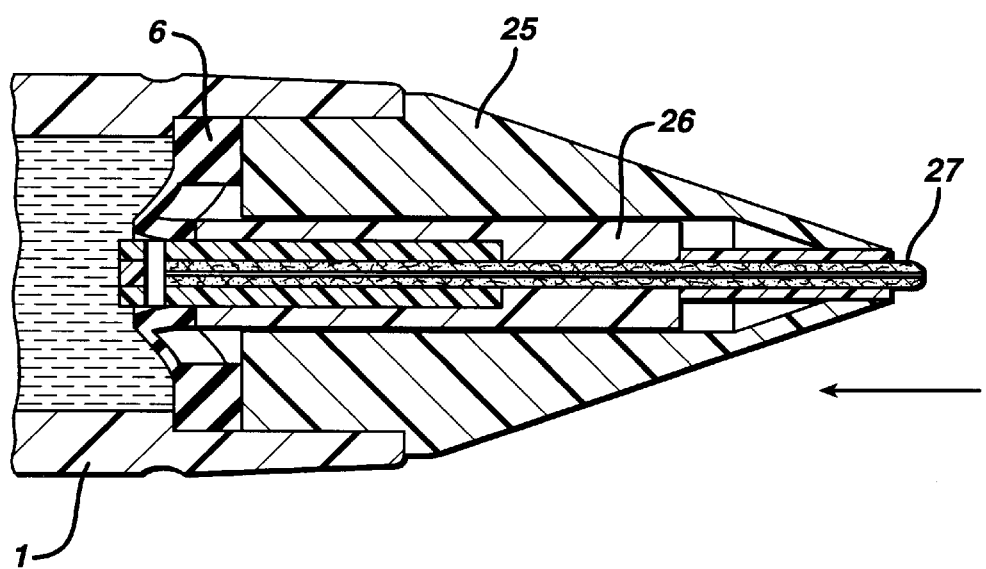
FIG. 2 is a view corresponding to FIG. 1 but with the valve shown open.

Shown in FIGS. 1 and 2 herein is a fiber tip pen. A washer 6 is held in a barrel 1 by a nose cone 25 fitted in the forward end and having an axial bore in which a cylindrical piston 26 is accommodated. Extending through a piston is a fiber rod 27 with a free end protruding through the leading end of the nose cone to define a writing tip. The ports 16 in the valve sleeve 15 serve to deliver ink from the reservoir chamber to the rear end of the fiber rod when the valve is opened by a force exerted on the writing tip causing the feed assembly consisting of the fiber rod, piston and valve sleeve to retract and the washer 6 to flex, as shown in FIG. 2.

Illustrated in FIGS. 3 and 4 herein is a fiber tip highlighter. The washer 6 is trapped within the forward end of the barrel 1 by a tubular nose piece 30 fitted to the barrel. A fiber core 33 is located within the nose piece and includes a head portion which is slidably guided relative to the nose piece by a bearing 34, the free end of the head being arranged to protrude from the nose piece and being shaped to define a broad edge for laying down a wide line of marker fluid. The rear end of the core bears on the central region of the washer 6 and is recessed to accommodate a central tube defining a feed channel 14 and the valve sleeve 15 surrounding the tube. When the marker tip is pressed against a surface, the core 33 retracts and causes the elastomeric washer 6 to flex rearwardly so that the valve is opened and the reservoir chamber is pressurized, whereby fluid is supplied to the core via the ports 16 and feed channel 14 and flows along the ducts in the core to the tip to be laid down thereby.

Figure 5:
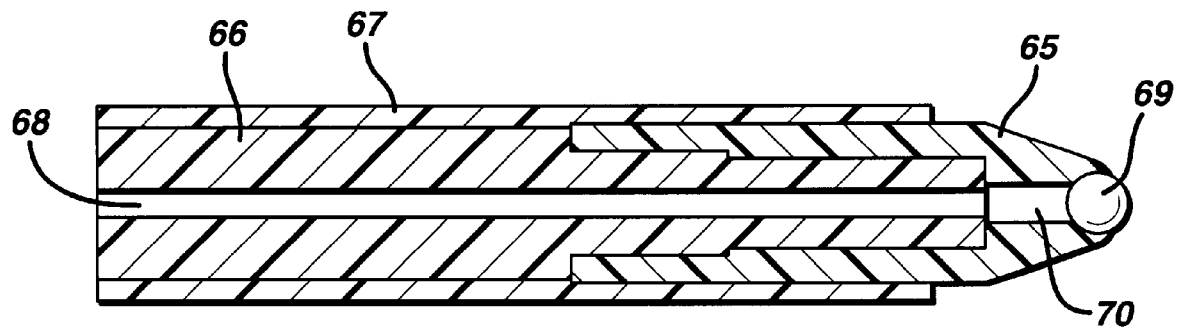
FIG. 5 is a marking tip of this invention with a roller ball.

Shown in FIG. 5 is a roller ball tip assembly which may be fitted into the sleeve of the pens similar to those shown in FIGS. 1 and 3. A ball housing 65 is telescoped together with a feed rod 66 within a tubular case 67. The feed rod has an axial bore 68 which conducts marker fluid to the ball 69. As shown a small secondary reservoir 70 is defined by the ball housing immediately behind the ball, but this may not be needed or could be given a greater volume if required.

The two working examples set forth below are to be construed as merely illustrative, and not limitative of the remainder of the disclosure in any way whatsoever. A total of eleven different liquid inks of this invention, i.e., Formulations 9-1, 9-2, 9-3, 9-4, 9-5, 9-6, 10-1, 11-1, 11-2, 11-3 and 13-1 as shown in Tables 1–4, were prepared in the two working examples. Formulations 9-0 and 10-0 as shown in Tables 1–3, on the other hand, are both prior art liquid inks.

Code names and abbreviations used in Tables 1–4 denote the following solvents, dyes, polymers and lubricants:

PM 71: diethylene glycol monoethyl ether, from Ashland Chemical, Dublin, Ohio

PM 78: phenyl cellosolve, from Ashland Chemical, Dublin, Ohio

PM 74: oleic acid, from Henbel Emery Group, Hoboken, N.J.

PM 83: dipropylene glycol, from Ashland Chemical, Dublin, Ohio

PM 81: polyvinylpyrolidone PVP K-90 (averaged M.W. $3.6 \times 10^5$), from BASF, Parsippany, N.J.

PM 21: Solvent Blue 38, from the Gillette Co., Boston, Mass.

PM 24: Solvent Violet 8, Neptun Violet Base, from BASF, Parsippany, N.J.

PM 25: Basic Blue 7, Basonyl Blue 636, from BASF, Parsippany, N.J.

PM 259: Solvent Black 46, Sepisol Fast Black CN, from BIMA, France

Resin SK: a ketone/formaldehyde resin, from Huls America, Rockleigh, N.J.

ODEA: oleic diethanolamine, Alkamide D02805, from Rhone-Poulenc, Monmolith Junction, N.J.

EXAMPLE 1

Blue Inks

Seven blue inks, 9-0 through 9-6, were prepared, their formulations being shown in Table 1 below. The viscosity, the coefficient of friction, the laydown and the buildup of each ink were measured. By "laydown" is meant the amount of ink deposited on a substrate from a marking instrument.

The viscosity of an ink was measured at a shear rate of 300 sec$^{-1}$ at room temperature using a Haake CV-100 Viscometer, made by Haake Buchler Instruments, Inc. of Saddle Brook, N.J., using ME-15 sensor system.

The writing friction of a ballpoint pen was measured by a friction tester which used a Schaevitz force transducer Model No. STD-G-100, manufactured by Schaevitz Engineering Corporation, Pennsanken, N.J., to measure frictional force for a ballpoint sliding on the surface of a sheet of paper. The ballpoint pen was writing on 60 pound white paper at 22 ft/min writing speed, 60 degree from horizontal writing angle and at 200 grams writing load. "Coefficient of friction" is defined as writing friction divided by writing load.

The laydown of a ballpoint pen is measured by a Hartley Write Test Machine, Model W-10, made by The Hartley Company, Costa Mesa, Calif., at 22 ft/min writing speed and 125 grams writing load. "Laydown" is defined as milligrams of ink per 185 feet of written line. "Buildup," on the other hand, is defined as the weight of ink (mg) attached to the tip of the marking instrument at the end of a laydown measurement.

Two different types of ball points, 451 SS point and Flex 474 point, were used to measure the writing friction, laydown and buildup. 451 SS point was made of stainless steel and used 1 mm tungsten carbide ball. Flex 474 point, on the other hand, was made of nickel silver and used 1 mm tungsten carbide ball.

TABLE 1

| | FORMULATIONS (% by weight) | | | | | | |
|---|---|---|---|---|---|---|---|
| | 9-0 | 9-1 | 9-2 | 9-3 | 9-4 | 9-5 | 9-6 |
| PM 71 | 19.8 | 25.8 | 25.5 | 25.6 | 25.5 | 25.7 | 24.8 |
| PM 78 | 19.8 | 25.8 | 25.5 | 25.5 | 25.S | 25.7 | 24.8 |
| PM 83 | 9.9 | 12.8 | 12.7 | 12.7 | 12.6 | 12.7 | 12.3 |
| PM 74 | 2.0 | 2.0 | 2.0 | 2.0 | 2.0 | 2.0 | 2.0 |
| Resin SK | 14.6 | 0.0 | 0.7 | 0.5 | 0.6 | 0.0 | 0.0 |
| PM 81 | 0.3 | 0.0 | 0.0 | 0.1 | 0.2 | 0.3 | 2.5 |
| PM 21 | 25.4 | 25.4 | 25.4 | 25.4 | 25.4 | 25.4 | 25.4 |
| PM 24 | 3.9 | 3.9 | 3.9 | 3.9 | 3.9 | 3.9 | 3.9 |
| PM 25 | 4.3 | 4.3 | 4.3 | 4.3 | 4.3 | 4.3 | 4.3 |
| Total | 100.0 | 100.0 | 100.0 | 100.0 | 100.0 | 100.0 | 100.0 |
| Viscosity$^1$ | 12500 | 350 | 380 | 400 | 520 | 460 | 4800 |

TABLE 1-continued

| | FORMULATIONS (% by weight) | | | | | | |
|---|---|---|---|---|---|---|---|
| | 9-0 | 9-1 | 9-2 | 9-3 | 9-4 | 9-5 | 9-6 |
| Coefficient of Friction | | | | | | | |
| Flex-474 | 0.16 | 0.11 | 0.11 | 0.11 | 0.10 | 0.10 | 0.13 |
| 451SS | 0.18 | 0.14 | — | — | — | — | — |
| Laydown$^2$ | | | | | | | |
| Flex-474 | 18.0 | 20.0 | 22.2 | 16.7 | 15.1 | 16.2 | 14.9 |
| 451SS | 17.1 | 18.3 | — | — | — | — | — |
| Buildup$^3$ | | | | | | | |
| Flex-474 | 0.37 | 0.47 | 0.27 | 0.90 | 0.13 | 0.10 | 0.10 |
| 451SS | 0.13 | 0.30 | — | — | — | — | — |

$^1$in centipoise or cps
$^2$in mg/185 ft
$^3$in mg

As shown in Table 1, the viscosity of the inks was adjusted by changing the amounts of two polymers, PM 81 (i.e., PVP) and Resin SK. The writing friction (which is proportional to the coefficient of friction) was greatly reduced when inks of lower viscosity were used.

Three additional blue inks, 11-1, 11-2 and 11-3, were prepared (see Table 2 below). Like 9-5, 11-1, 11-2 and 11-2 all had a polymer content of 0.3% (i.e., 0.3% PVP). However, 11-1 and 11-2 differed from 9-5 in that they contained 10% and 20% more of each of the dyes (i.e., PM 21, PM 24 and PM 25), respectively. 11-3, on the other hand, contained the same amount of total dyes (i.e., PM 21, PM 24 and PM 25) as 9-5, with a PM 24 content being twice that of 9-5. The viscosity, the coefficient of friction and the buildup and the laydown were measured following the same procedures described above. As shown in Table 2, all three inks gave writing friction which was slightly higher than 9-5.

The line intensity of the three inks was also measured using a light reflectance measuring apparatus, Macbeth PCM II, made by Macbeth Division of Kollmorgen Corp. of Newburgh, N.Y., with filter A. Line intensity is a measure of the darkness of a written line, in this instance, % reflectance. The lower the value for % reflectance, the darker the line. Absolute black would give a zero % reflectance value. As shown in Table 2, all three inks gave satisfactory line intensity.

TABLE 2*

| | FORMULATIONS (% by weight) | | |
|---|---|---|---|
| | 11-1 | 11-2 | 11-3 |
| PM 71 | 24.3 | 23.0 | 25.7 |
| PM 78 | 24.3 | 23.0 | 25.7 |
| PM 83 | 12.1 | 11.4 | 12.8 |
| PM 74 | 2.0 | 2.0 | 2.0 |
| Resin SK | 0.0 | 0.0 | 0.0 |
| PM 81 | 0.3 | 0.3 | 0.3 |
| PM 21 | 27.9 | 30.5 | 22.0 |
| PM 24 | 4.3 | 4.7 | 7.9 |
| PM 25 | 4.7 | 5.2 | 3.7 |
| Total | 100.0 | 100.0 | 100.0 |
| Viscosity | 910 | 1650 | 450 |
| Coefficient of Friction† | 0.13 | 0.14 | 0.11 |
| Buildup† | 0.40 | 0.30 | 0.5 |

TABLE 2*-continued

| | FORMULATIONS (% by weight) | | |
|---|---|---|---|
| | 11-1 | 11-2 | 11-3 |
| Laydown† | 15.7 | 16.6 | 16.9 |
| Line Intensity† | 23.2 | 24.5 | 23.2 |

*Footnotes 1–3 of Table 1 are applicable here.
†Flex-474 points were used.

An additional liquid ink, 13-1, was prepared and various properties thereof were measured and compared with those of 11-3 and 9-0 (see Table 3 below). Except for the laydown, other properties were determined following the same procedures described above. The laydown was measured using an ANJA Write Test Machine, W-10 Model B, made by Anja Engineering Corporation of Monrovia, Calif. at 22 ft/min writing speed and 200 grams writing load.

Note that 13-1 differed from 11-3 only in that it only contained a single dye, PM 71. By contrast, three dyes, PM 71, PM 78 and PM 83, were included in 11-3. Since PM 71 has a viscosity lower than that of PM 78 or PM 83, 13-1 is less viscous than 11-3. As shown in Table 3, 13-1 and 11-3 were very similar in terms of writing friction, buildup, laydown and line intensity. Both inks gave a much lower writing friction than 9-0, a prior art ink.

TABLE 3*

| | FORMULATIONS (% by weight) | | |
|---|---|---|---|
| | 13-1 | 11-3 | 9-0 |
| PM 71 | 64.1 | 25.7 | 19.8 |
| PM 78 | 0.0 | 25.7 | 19.8 |
| PM 83 | 0.0 | 12.8 | 9.9 |
| PM 74 | 2.0 | 2.0 | 2.0 |
| Resin SK | 0.0 | 0.0 | 14.0 |
| PM 81 | 0.3 | 0.3 | 0.3 |
| PM 21 | 22.0 | 22.0 | 25.4 |
| PM 24 | 7.9 | 7.9 | 3.9 |
| PM 25 | 3.7 | 3.7 | 4.3 |
| Total | 100.0 | 100.0 | 100.0 |
| Viscosity | 150 | 450 | 12500 |
| Coefficient of Friction† | 0.11 | 0.11 | 0.16 |
| Buildup† | 0.5 | 0.5 | 0.4 |
| Laydown† | 17.8 | 16.9 | 18.0 |
| Line Intensity† | | | |
| initial | 15.5 | 16.6 | 18.3 |
| after 185 ft | 14.5 | 14.8 | 15.3 |

*Footnotes 1–3 of Table 1 are applicable here.
†Flex-474 points were used.

EXAMPLE 2

Black Inks

Two black inks, 10-0 and 10-1, were prepared (see Table 4 below). 10-0, a prior art high-viscosity ink, had a polymeric content of 27.2%, i.e., 27% of Resin SK and 0.2% of PM 81 (PVP). By contrast, 10-1 did not contain any polymers. As a result, it had a very low viscosity (60 cps) and gave much lower writing friction than 10-0 using the ballpoint pen Flex-474.

TABLE 4*

| | FORMULATIONS (% by weight) | |
|---|---|---|
| | 10-0 | 10-1 |
| PM 71 | 17.8 | 27.9 |
| PM 78 | 30.3 | 47.4 |
| PM 74 | 1.0 | 1.0 |
| ODEA | 27.0 | 1.0 |
| Resin SK | 27.0 | 0.0 |
| PM 81 | 0.2 | 0.0 |
| PM 259 | 22.7 | 22.7 |
| Total | 100.0 | 100.0 |
| Viscosity | 7500 | 60 |
| Coefficient of Friction | | |
| Flex-474 | 0.18 | 0.11 |
| 451SS | 0.18 | 0.18 |
| Buildup | | |
| Flex-474 | — | 0.17 |
| 451SS | 0.10 | 0.23 |

*Footnotes 1 and 3 of Table 1 are applicable here.

Without further elaboration, it is believed that one skilled in the art can, based on the above working examples and other descriptions herein, utilize the present invention to its fullest extent.

OTHER EMBODIMENTS

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A marking instrument which comprises a body, a reservoir chamber within said body, and a non-erasable liquid ink in said chamber, said ink comprising a colorant, a solvent, and one or more polymers with number average molecular weights ranging from about $1 \times 10^4$ to $5 \times 10^5$ daltons said ink having a viscosity of from about 15 to 4,500 cps and a water content of less than 15% by weight.

2. The marking instrument of claim 1, wherein said ink has a viscosity of about 50 to 2,000 cps.

3. The marking instrument of claim 2, wherein said ink has a viscosity of about 100 to 1,000 cps.

4. The marking instrument of claim 3, wherein said ink has a viscosity of about 150 to 600 cps.

5. The marking instrument of claim 4, wherein the total content of said one or more polymers is about 0.05% to 2.5% by weight of said ink.

6. The marking instrument of claim 5, wherein the total content of said one or more polymers is about 0.05% to 1% by weight of said ink.

7. The marking instrument of claim 6, wherein the total content of said one or more polymers is about 0.3% by weight of said ink.

8. The marking instrument of claim 1, further comprising an ink feed device having a channel for conducting said ink from said chamber to a marking tip, an elastomeric member which partly confines said chamber and supports said feed device with respect to said body, and a valve defined by said feeding device and said elastomeric member for controlling communication between said chamber and said channel, whereby said feed device is retractable relative to said body under a force exerted against said tip, and in response to such retraction said chamber is pressurized by deflection of said elastomeric member and said valve is opened to allow said ink to enter said channel from said chamber.

9. The marking instrument of claim 8, wherein said marking tip is a roller ball.

10. The marking instrument of claim 1, wherein the total content of said one or more polymers is about 0.05% to 2.5% by weight of said ink.

11. The marking instrument of claim 1, wherein the one or more polymers comprises polyvinylpyrrolidone.

12. The marking instrument of claim 1, wherein the one or more polymers includes a ketone/formaldehyde.

13. A marking instrument which comprises a body, a reservoir chamber within said body, and a non-erasable liquid ink in said chamber, said ink comprising a water-soluble colorant, a solvent, and one or more polymers with number average molecular weights ranging from about $1 \times 10^4$ to $5 \times 10^5$ daltons, said ink having a viscosity of from about 5 to 4,500 cps and being substantially free of water.

* * * * *

UNITED STATES PATENT AND TRADEMARK OFFICE
CERTIFICATE OF CORRECTION

PATENT NO.   : 6,075,070
DATED        : June 13, 2000
INVENTOR(S)  : Lin et al.

It is certified that error appears in the above-identified patent and that said Letters Patent is hereby corrected as shown below:

<u>Column 10,</u>
Line 9, please delete "about 5 to 4,500" and insert -- about 15 to 4,500 -- therefor.

Signed and Sealed this

Thirty-first Day of August, 2004

JON W. DUDAS
*Director of the United States Patent and Trademark Office*